Jan. 27, 1970      J. H. COOPER      3,492,024
TRAILER HITCH FOR MOTORCYCLES
Filed Oct. 6, 1967
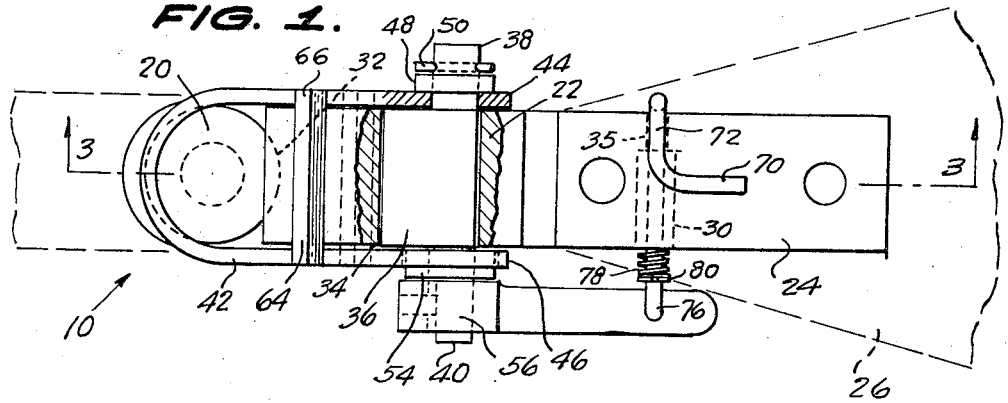
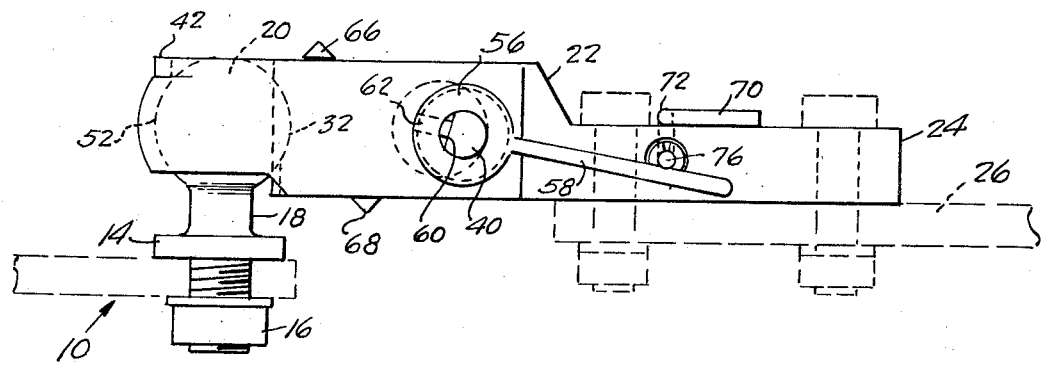
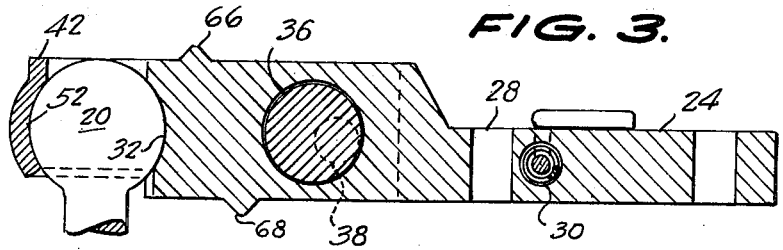
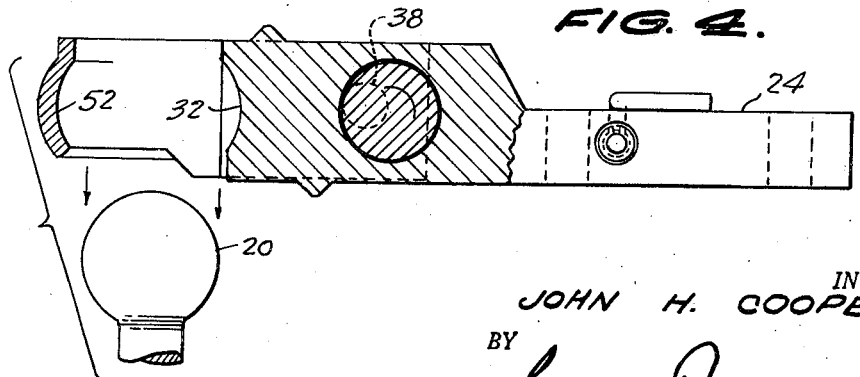
INVENTOR.
JOHN H. COOPER,
BY
Berman, Davidson & Berman
ATTORNEYS.

United States Patent Office 3,492,024
Patented Jan. 27, 1970

3,492,024
TRAILER HITCH FOR MOTORCYCLES
John H. Cooper, 1928 Verna Lane, Boise, Idaho 83706
Filed Oct. 6, 1967, Ser. No. 673,496
Int. Cl. B60d 1/06; B62j 39/00
U.S. Cl. 280—512                                   4 Claims

ABSTRACT OF THE DISCLOSURE

A device for hitching a trailer to the rear end of a motorcycle, said device comprising: a ball member to be secured to a motorcycle; a body member to be secured to a trailer; a cylinder mounted in the body member and having eccentric studs at each end; a fork having legs overlying said body member and engaging said studs and a handle for turning said cylinder.

---

It is an object of this invention to provide a hitch for connecting a trailer to the rear end of a motorcycle in such manner as to form a joint articulated in three dimensions.

It is a further object of this invention to provide a device as aforesaid in which the portion mounted on the motorcycle is of minimum size and weight.

It is a further object of this invention to provide a device as aforesaid in which the portion mounted on the trailer may be engaged with the portion on a motorcycle quickly and easily and retained as long as desired with no danger of separation.

It is a further object of this invention to provide a device as aforesaid which may quickly and easily be disengaged so as to separate the trailer from the motorcycle.

The above and other objects will be made clear from the following detailed description taken in connection with the annexed drawing, in which:

FIGURE 1 is a top plan view partially in section of the improved device;

FIGURE 2 is a side elevation of FIGURE 1;

FIGURE 3 is a central vertical cross-section through FIGURE 2, showing the parts in engaged position; and FIGURE 4 is a view similar to FIGURE 3, showing the parts in open or released position.

Motorcycles like horses have a great deal more strength in pull than they have in "carry," that is, while a vertical load of a 1,000 pounds directly on the motorcycle probably would be disastrous to most motorcycles. A 1,000 pound load mounted on wheels easily can be pulled by most motorcycles. Popularity of the motorcycle as a means of transportation has increased very rapidly in the last few years but as a means of transportation, however, convenient and economical it may be so far as the human body is concerned, it is quite impossible with the conventional motorcycle to carry any appreciable amount of luggage when a trip of any length or duration is contemplated. Side cars are expensive and deprive the motorcycle of many of its advantages in compactness and the ability to thread through traffic. A trailer which can be used or disengaged at will is the ideal solution for the occasional luggage carrying need.

The present invention contemplates a device for hitching such a trailer to a motorcycle in which the attachment is quite convenient and positive and disengagement is equally quick, convenient and positive. In addition, this is accomplished with the permanent attachment to the motorcycle of an extremely minor part, adding virtually no perceptible weight to the vehicle and occupying no particularly otherwise useful space.

Referring now to FIGURE 1, a suitable portion of the rear end of the motorcycle is designated generally by the numeral 10. A portion is drilled, as shown in FIGURE 2, to receive the threaded shank 12 of a hitch member which engages the portion 10 and clamps it between a flange 14 and a nut 16. A stem 18 rises from the flange 14 and is surmounted by a ball 20. These are the only parts permanently attached to the motorcycle and even these may readily be detached during periods when there is no need for attachment of a trailer.

The hitch proper is made up of a body portion 22 which terminates rearwardly in a stem 24 for attachment to the trailer tongue 26. The tongue 24 is drilled as at 28 for securement to the tongue 26 and also has a transverse bore 30 for a purpose to be presently described.

At its forward end the body portion 22 has formed a spherical pocket 32, the radius to conform about the ball 20. The body portion 22 with its pocket 32 constitutes a fixed jaw. The transverse bore 34 is formed in the body portion 22 and receives a cylinder 36 which has at each end aligned eccentrically placed studs 38 and 40.

A U-shaped fork member 42 is sized to have one leg 44 overlie one side of the body portion 22. This leg 44 is drilled to a diameter permitting a free running fit of the stud 38. The other leg 46 overlies the opposite face of the body portion 22 and is drilled to pass the cylinder 36 so that the fork 42 is properly placed on the body portion 22, a cylinder 36 and its associated studs may be passed through the leg 46 so that one stud 38 passes through the leg 44. A washer 48 and cotter pin 50 serve to secure the members against disassembly.

In the curve of the U-shaped part of member 42 there is formed a spherical pocket 52 which is also of a radius to accommodate the ball 20. A washer 54 is provided with a bore to fit the stud 40 of the cylinder 36 and overlying the washer 54 is the hub 56 of an operating handle 58. The stud 40 has a flattened portion 60 which is engaged by a set screw 62 threaded into the hub 56 of the handle 58. The U-shaped member 42 with its pocket 52, when mounted in the manner just described, constitutes a second jaw pivotally mounted on the body portion 22.

In FIGURES 1, 2 and 3, the parts are shown in engaged position, that is, the position they would occupy when the motorcycle is pulling the trailer. In FIGURE 4, the parts are shown in released condition, that is, the handle 58 has been turned from 90 to 180 degrees, thereby rotating the cylinder 36 within the body portion 22 and thereby moving the studs 38 and 40 forwardly toward the motorcycle to move the socket 52 away from the ball 20, permitting withdrawal of the fork 42 and the body portion 22 away from the ball 20. While in the engaged position, considerable three-dimensional freedom is provided as between the member 10 and the body portion 22 and, therefore, the trailer tongue 26. In the horizontal plane, almost complete freedom is required in order to negotiate turns. In the vertical, however, there should be some limited movement and, accordingly, on the top side of the body member 22 there is formed a stop member 64 having an end 66 projecting outwardly over the leg 44 of the fork member 42. On the underside of the body portion 22 a similar stop member 68 is provided which similarly overlaps and engages the leg 46.

It will be noted that no matter whether the handle 58 be turned clockwise or counterclockwise from its position shown in FIGURES 1 and 2, release to the position of FIGURE 4 will occur. It is necessary, therefore, to provide some means to restain handle 58 in the closed or engaged position.

The above problem is solved through the use of the bore 30 previously noted as being formed in the stem 24 of the body portion 22. A piece of rod stock is bent to form a handle portion 70, a horizontal leg 72, a vertically depending leg 74, and a horizontal leg 76. The bore 30 has a constricted portion 30' which receives and guides the part 76. A spring 78 surrounds the portion 76 and extends into the bore 30 and bears against a split washer 80 which fits a groove in the member 76. Accordingly, horizontal pressure on the handle portion 70 will withdraw the member 76 from the path of the handle 58, permitting free movement of the handle either clockwise or counterclockwise for disengagement to the position of FIGURE 4. When the parts are reengaged the handle 58 is brought to overlie the portion 76 to prevent accidental dropping. The chance of the handle 58 of its own motion rising counterclockwise sufficiently to bring about disengagement is so remote as to be negligible.

While certain specific details have been disclosed herein, as an adjunct to describing the device, various details may be altered without departure from the basic concept of this invention. Accordingly, the invention is not to be limited to the precise details disclosed.

What is claimed is:

1. A hitch for securing a trailer to a motorcycle, said hitch comprising a ball member to be secured to a motorcycle; a body member to be secured to a trailer; a jaw formed in said body member; a second jaw pivotally connected to opposed, external sides of said body member and means in said pivotal connection for causing said pivoted jaw to recede from and move toward said first-named jaw for disengagement and engagement with said ball member.

2. A hitch as set forth in claim 1, including retaining means for said jaw moving means.

3. A hitch as set forth in claim 1, in which said pivotal connection comprises a cylinder rotatably mounted in said body portion, and eccentric studs at opposite ends of said cylinder, said second jaw pivotally receiving said studs and means for rotating said cylinder.

4. A hitch as set forth in claim 3, including retaining means for said cylinder rotating means.

References Cited

UNITED STATES PATENTS

| | | | |
|---|---|---|---|
| 1,314,577 | 9/1919 | Dickerson | 280—513 X |
| 2,181,178 | 11/1939 | Duncan | 280—513 |
| 2,370,988 | 3/1945 | Neal | 280—292 X |
| 2,435,019 | 1/1948 | Scott | 280—513 |
| 2,167,520 | 7/1939 | Claud-Mantle | 280—512 |
| 2,768,839 | 10/1956 | Riemann | 280—512 |

LEO FRIAGLIA, Primary Examiner

U.S. Cl. X.R.

280—292, 513